Figure 1:
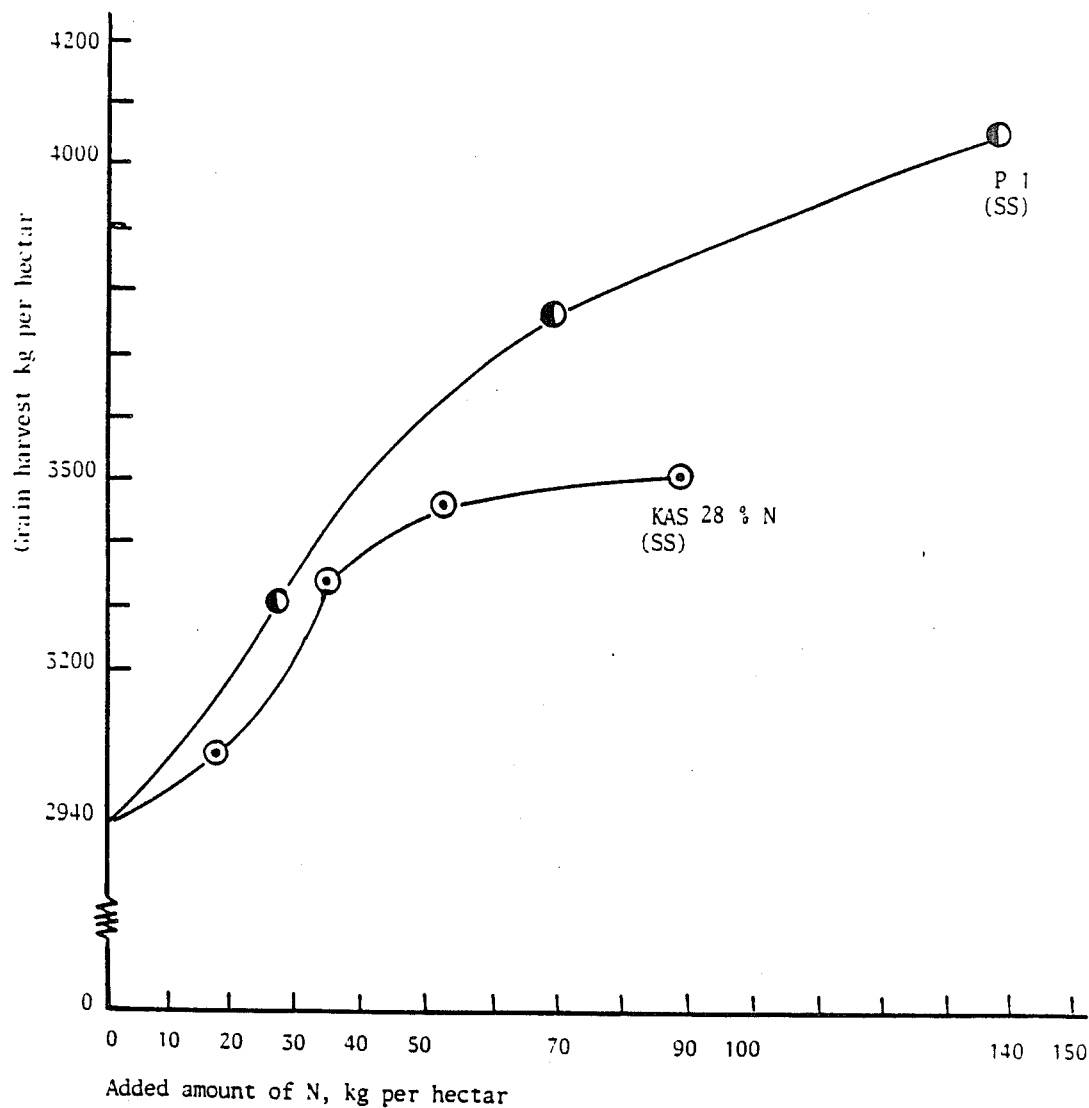

United States Patent [19]

Haeffner et al.

[11] Patent Number: 4,776,131
[45] Date of Patent: Oct. 11, 1988

[54] PLANT NUTRIENT PRODUCT

[76] Inventors: Erik Haeffner, Svanholmsvägen 29, S-182 75 Stocksund; Olav Thrap-Olsen, Älgvägen 13, S-181 43 Lidingö, both of Sweden

[21] Appl. No.: 142,251
[22] PCT Filed: Dec. 29, 1983
[86] PCT No.: PCT/SE83/00484
  § 371 Date: Aug. 28, 1985
  § 102(e) Date: Aug. 28, 1985
[87] PCT Pub. No.: WO85/03071
  PCT Pub. Date: Jul. 18, 1985

Related U.S. Application Data

[63] Continuation of Ser. No. 776,201, Aug. 28, 1985, abandoned.

[51] Int. Cl.$^4$ .................. A01C 1/06; C05F 7/00
[52] U.S. Cl. ........................... 47/57.6; 71/24
[58] Field of Search .......... 47/9, 57.6, 48.5, 56, 47/58; 71/64.13, 9, 13, 23, 24, 64.03, 64.05

[56] References Cited

U.S. PATENT DOCUMENTS

| | | | |
|---|---|---|---|
| 1,988,307 | 1/1935 | Fay | 47/48.5 X |
| 2,092,100 | 9/1937 | Waynick | 47/9 X |
| 2,163,860 | 6/1939 | White | 47/9 |
| 2,877,599 | 3/1959 | Hebestreet et al. | 47/9 |
| 2,881,066 | 4/1959 | Sproull et al. | 47/9 X |
| 3,178,267 | 4/1965 | Larson | 71/9 X |
| 3,218,149 | 11/1965 | Sproull et al. | 47/9 X |
| 3,269,824 | 8/1966 | Aswell | 47/9 X |
| 3,616,573 | 11/1971 | Clifford | 47/57.6 |
| 3,836,299 | 9/1974 | Houston et al. | 47/57.6 |
| 4,067,716 | 1/1978 | Sterrett | 47/9 |
| 4,145,206 | 3/1979 | Ford | 47/57.6 X |
| 4,241,537 | 12/1980 | Wood | 47/57.6 X |
| 4,369,054 | 1/1983 | Shinholster | 71/64.13 |
| 4,571,254 | 2/1986 | Wahlberg | 71/64.13 X |
| 4,589,226 | 5/1986 | Stensaas | 47/57.6 X |

FOREIGN PATENT DOCUMENTS

| | | | |
|---|---|---|---|
| 500245 | 3/1954 | Canada | 71/9 |
| 1592790 | 3/1971 | Fed. Rep. of Germany | 47/9 |
| 375982 | 5/1975 | Sweden | 47/9 |
| 78017894 | 8/1979 | Sweden | 47/9 |
| 82040080 | 12/1983 | Sweden | 47/9 |
| 1259844 | 1/1972 | United Kingdom | 47/57.6 |

Primary Examiner—Robert A. Hafer
Assistant Examiner—Danton D. DeMille
Attorney, Agent, or Firm—Burns, Doane, Swecker & Mathis

[57] ABSTRACT

The present invention relates to a method of increasing the harvest yield in plant cultivation, the soil being supplied with plant nutrient depots comprising a mixture of bark, and peat, preferably provided with plant nutrient substances (N,P,K) and trace substances, said mixture being composted which are pressed in an extruder press to achieve the formation of pellets and dried to a water content of about 10-15% by weight.

14 Claims, 2 Drawing Sheets

PLANT NUTRIENT PRODUCT

This application is a continuation of application Ser. No. 776,201, filed Aug. 28, 1985 now abandoned.

DESCRIPTION

In land utilization the consumption of inorganic plant nutrients, so-called commerical fertilizers, has greatly increased in recent years. Such fertilizers contain nitrogen, phosphorous, potassium and trace substances essential to the plants. Normally, these chemical elements are present in chemical compounds which are readily dissolved in water and which can therefore be rapidly leached out from the top soil layer by rain water and carried therewith into water-ways and lakes, creating serious environmental problems. Consequently, when plant nutrients are administered in the form of commerical fertilizers great losses are often experienced.

When commercial fertilizers are used annually over long periods of time, contaminants in the form of heavy metals are liable to collect in the ground, in a chemical form such as to be drawn into and be concentrated in the plants. Heavy metals can also be found in excessively high concentrations when untreated digested sewage sludge from sewage works is used as a fertilizer.

The present invention is based on the discovery that it is possible to create durable physical and chemical environment of such description that a plant nutrient can be supplied to the roots of the plants with a much greater efficiency (yield) than was previously considered possible. By practicing the present invention it is possible to significantly improve the harvest yield, i.e. to produce larger harvests per ground area and amount of nutrients supplied than has previously been possible with earlier methods.

The essential features of the invention reside in providing the soil not only with nutrients as such, but also simultaneously with the chemical, physical, and biological environment required in order for the plants, through their roots, to fully utilize the nutrients in an optimal manner, while any surplus of nutrients remain in the soil from one growing season to the next.

Figure 2:
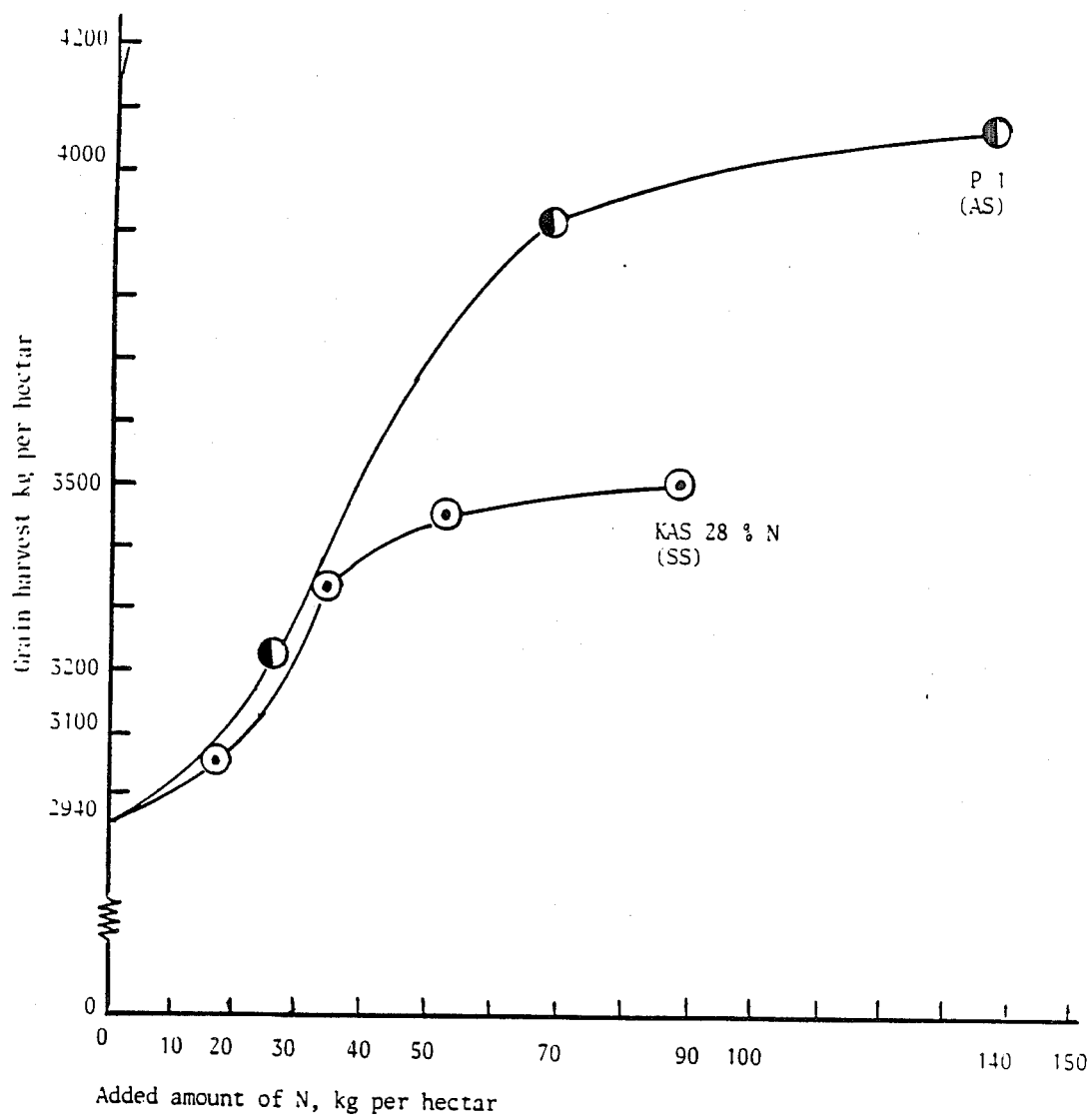

In accordance with the invention, the nutrient substances are incorporated and adsorbed in pellets of a compostible and composted, ground biomaterial, such as the finely-divided bark of conifers, de-watered and shredded peat, disintegrated newsprint, compostible and composted fractions of domestic waste, straw and common reed, either with or without the addition of fresh or digested sludge from communal sewage works. The surprisingly high yield which can be obtained when praticing the invention is illustrated in FIGS. 1 and 2, FIG. 1 illustrates the harvest yield when administering various nitrogen additions, on one hand as commercial fertilizer, KAS, and on the other hand as plant nutient pellets, P1, according to the present invention. It will be seen from FIG. 2 that even when the nutrient substance according to the invention is administered in the Autumn, about six months before the seed is to be sown, the yield per hectare and amount of nitrogen supplied is greater than when nitrogen is administered in the Spring under otherwise similar conditions.

This shows that the present pellets create a depot effect in the soil with regard to distribution of plant nutrients, the addition of microbiological activities, and other factors, which are essential for a good harvest result. At the same time as the nutrient effect greatly increases in accordance with the illustrated diagram, any heavy metals present are bound to the bark in the form of insoluble so-called chelate compounds, which prevents the plants from taking up heavy metals, or reduces the extent to which such metals are taken up.

EXAMPLE

Bark having a dry substance contents of 250 kg was shredded to a particle size of at most 5 mm and was mixed thoroughly with de-watered peat having a dry substance contents of 250 kg and containing other disintegrated biomass. The mixing continued until a homogenous mass having an optimal water content with regard to composting was obtained. This mass was composted in a vertical reactor vessel, while continuously aerating the mass and turning it over. During the composting process the mass is heated to 70° C. for such a time that any patogenic bacteria present are killed off.

Composting involves a biological degradation of the biological mass involved, which leads to a stabilization of the organic material, and the mixture is made hygienic by the heat generated, as mentioned above. This is particularly important in the case where digested sludge from a sewage work is included. Intended plant nutrients were added to the composted mass in a chemical form such as to prevent the nutrients from leaving during the manufacturing process. In certain cases, the plant nutrients can be added prior to the composting process.

The thus enriched mixture having a moisture content of about 45% was compressed to a relatively high density (about 0.8-1.0) and was formed into pellets in a pellet extruder or pelletizing machine, the pellets being dried and cooled, whereby mechanically very strong pellets were obtained. Pelletizing also facilitates handling, transportation, and spreading of the product.

The ready-to-use pelleted product has a moisture content of 10-15% by weight, which is a reasonable level, at which no microbiological activities occur during storage.

When compressing the mixture during the pelletizing process the nutrients are adsorbed on and bound with the organic material, and are slowly released in the soil in keeping with the take-up ability of the plants. Such trace elements as Mg, Mn, B, Co, and Cu can also be added to the homogenous mass together with the plant nutrients prior to the pelletizing process.

The composted organic content of the pellets increases the biological activity when mixed with the soil, and provides for an extended fertilizing effect (aftereffect). The biological material present, bark, and peat, shows moveover an ability to bind water, whereby the water-retention provides for an adequte environment for the nutrient uptake.

In an alternative embodiment of the invention bark, peat, and sewage sludge are mixed in the relation 25:25:50 with regard to dry substance content, and is provided with plant nutrients in a suitable form. The mixture is then pelletized, and introduced into a reactor to be composted by means of a continous aeration. After completed composting, spreading to the soil is carried out in known ways.

Simultaneously with pelletizing, seeds can be added to the mass which is to be pelletized, whereby a product is obtained which provides initially the best conditions for germination and nutrient emission during the first period of time in the soil. By means of the water retention ability of the biomass optimal conditions for the seed are obtained, and the risk for a destroyed sowing by drying is eliminated.

We claim:

1. A method for increasing harvest yield in plant cultivation comprising supplying plant nutrient depots in the form of pellets, which are comprised of bark, peat, and sewage sludge in a dry weight ratio of 25:25:50, plant nutrient substances and a water content of 10-15% by weight, whereby the plant nutrient depots have the following properties:
   (1) high bacteriological property;
   (2) plant nutrition in a form available to plants;
   (3) water retaining ability;
   (4) binding capacity during pellet formation; and
   (5) capacity for chemical binding of heavy metals.

2. A plant nutrient depot in the form of pellets which comprise particles of bark having a particle size up to 5 mm, peat and sewage sludge in a dry weight ratio of 25:25:50, said pellets having a moisture content of 10 to 15% by weight.

3. The plant nutrient depot of claim 2 wherein the pellets further contain seeds.

4. The plant nutrient depot of claim 2 wherein the pellets further contain trace elements selected from magnesium, manganese, boron, cobalt and copper.

5. The plant nutrient depot of claim 2 wherein specific gravity of the pellets is about 0.8 to 1.0.

6. The plant nutrient depot of claim 2 wherein the bark is from conifers.

7. A method of preparing plant nutrient depots comprising:
   (a) forming a mixture composed of bark, peat, sewage sludge and water, said mixture having a moisture content of about 45%;
   (b) forming the mixture into pellets wherein the mixture is composted before being formed into said pellets; and
   (c) drying the pellets to a moisture content of 10 to 15% by weight wherein the pellets have a dry weight ratio of bark, peat and sewage sludge of 25:25:50.

8. The method of claim 7 wherein the pellets have a specific gravity of about 0.8 to 1.0.

9. The method of claim 7 wherein seeds are added to the mixture when the mixture is formed into pellets.

10. The method of claim 7 wherein trace elements selected from magnesium, manganese, boron, cobalt and copper are added to the mixture prior to the formation of the pellets.

11. A method of preparing plant nutrient depots comprising:
    (a) forming a mixture composed of bark, peat, sewage sludge and water, said mixture having a moisture content of about 45%;
    (b) forming the mixture into pellets wherein the mixture is composted after being formed into said pellets; and
    (c) drying the pellets to a moisture content of 10 to 15% by weight wherein the pellets have a dry weight ratio of bark, peat and sewage sludge of 25:25:50.

12. The method of claim 11 wherein the pellets have a specific gravity of about 0.8 to 1.0.

13. The method fo claim 11 wherein the seeds are added to the mixture when the mixture is formed into pellets.

14. The method of claim 11 wherein trace elements selected from magnesium, manganese, boron, cobalt and copper are added to the mixture prior to the formation of the pellets

* * * * *